United States Patent
Heinrich et al.

(10) Patent No.: US 9,329,671 B2
(45) Date of Patent: May 3, 2016

(54) POWER-EFFICIENT INTER PROCESSOR COMMUNICATION SCHEDULING

(71) Applicant: Nvidia Corporation, Santa Clara, CA (US)

(72) Inventors: Greg Heinrich, Sophia Antipolis (FR); Philippe Guasch, Sophia Antipolis (FR)

(73) Assignee: Nvidia Corporation, Santa Clara, CA (US)

( * ) Notice: Subject to any disclaimer, the term of this patent is extended or adjusted under 35 U.S.C. 154(b) by 380 days.

(21) Appl. No.: 13/753,174

(22) Filed: Jan. 29, 2013

(65) Prior Publication Data

US 2014/0215236 A1 Jul. 31, 2014

(51) Int. Cl.
*G06F 1/26* (2006.01)
*G06F 1/32* (2006.01)
*G06F 9/48* (2006.01)

(52) U.S. Cl.
CPC .............. *G06F 1/329* (2013.01); *G06F 1/3293* (2013.01); *G06F 9/4893* (2013.01); *G06F 1/3203* (2013.01)

(58) Field of Classification Search
CPC ..... G06F 1/329; G06F 1/3203; G06F 9/3836; Y02B 60/1217
USPC ......................................................... 713/320
See application file for complete search history.

(56) References Cited

U.S. PATENT DOCUMENTS

| | | | |
|---|---|---|---|
| 4,435,758 A * | 3/1984 | Lorie et al. | 712/22 |
| 5,850,521 A * | 12/1998 | Morganti et al. | 709/208 |
| 2005/0021807 A1* | 1/2005 | Van Eijndhoven et al. | 709/231 |
| 2005/0204360 A1* | 9/2005 | Meleshchuk | 719/314 |
| 2005/0229184 A1* | 10/2005 | Inoue et al. | 719/310 |
| 2006/0106958 A1* | 5/2006 | Khawand et al. | 710/52 |
| 2008/0288949 A1* | 11/2008 | Bohra et al. | 718/104 |
| 2009/0019450 A1* | 1/2009 | Mori et al. | 718/105 |
| 2009/0055829 A1* | 2/2009 | Gibson | 718/103 |
| 2009/0150696 A1* | 6/2009 | Song et al. | 713/323 |
| 2009/0158299 A1* | 6/2009 | Carter | 719/319 |
| 2009/0300626 A1* | 12/2009 | Sturdy | 718/102 |
| 2011/0292979 A1* | 12/2011 | Kim et al. | 375/222 |
| 2014/0201411 A1* | 7/2014 | Kumar et al. | 710/262 |
| 2014/0281623 A1* | 9/2014 | Zhang et al. | 713/323 |

\* cited by examiner

*Primary Examiner* — Vincent Tran
*Assistant Examiner* — Volvick Derose (57) ABSTRACT

Computer system, method and computer program product for scheduling IPC activities are disclosed. In one embodiment, the computer system includes first processor and second processors that communicate with each other via IPC activities. The second processor may operate in a first mode in which the second processor is able to process IPC activities, or a second mode in which the second processor does not process IPC activities. Processing apparatus associated with the first processor identifies which of the pending IPC activities for communicating from the first processor to the second processor are not real-time sensitive, and schedules the identified IPC activities for communicating from the first processor to the second processor by delaying some of the identified IPC activities to thereby group them together. The grouped IPC activities are scheduled for communicating to the second processor during a period in which the second processor is continuously in the first mode.

20 Claims, 2 Drawing Sheets

POWER-EFFICIENT INTER PROCESSOR COMMUNICATION SCHEDULING

TECHNICAL FIELD

The disclosure relates to computers and, more specifically, inter processor communication.

BACKGROUND

The demand for processing power in computer systems is increasing. Increasing the processing power of a computer system often results in an increase in the power consumed by the computer system. However, for computer systems implemented on user devices, such as mobile smart phones and tablets, it is important to keep the power consumption of the computer system at a low level because, for example, the power supply to the user device may be limited. For example, the user device may be battery-operated, in which case it is particularly important to prevent the processing power from becoming too high in order to ensure that the battery life of the user device is not reduced to an unacceptable level by the implementation of the processor on the user device.

In order to address the issue of the trade-off between higher processing power and lower power consumption, a computer system may include two (or more) sub systems, which each implement a separate processor. The multiple processors operate independently, for example performing specialized tasks in the computer system. For example, a user device such as a smart phone or tablet may implement a first subsystem including a baseband processor and a second subsystem including an application processor (AP). The baseband processor acts as a Radio Frequency (RF) modem thereby processing data for communication between the user device and a radio network. The application processor executes an operating system of the user device and handles other multimedia features on the user device, and for example processes data relating to peripherals of the user device such as a display, a Wi-Fi module, a GPS module, etc.

Communication between the two sub-systems (i.e. between the processors of the two subsystems) is referred to as Inter Processor Communication (IPC). "IPC activities" are communications between the two processors. The IPC activities convey various types of information, spread over several communication channels, including:
  control information (e.g. for initiating a voice call between the user device and another node of the radio network);
  data (e.g. Internet Protocol (IP) data for transmission between the user device and another node of the radio network);
  logging information; and
  file system information (e.g. when the baseband file system is physically located on AP-managed Flash memory).

Each processor may operate in one of a plurality of possible operational modes. For example, the Application Processor may operate in an awake mode in which it is able to process IPC activities that it receives from the baseband processor. The Application Processor may alternatively operate in a sleep mode in which it does not process IPC activities. Typically the Application Processor will consume less power when it operates in the sleep mode compared to when it operates in the awake mode. Therefore, when no IPC activities are being communicated between the processors, the Application Processor may be configured to operate in the sleep mode to conserve power. Every time a quantum of data is sent over the IPC from the baseband processor to the Application Processor, the Application Processor needs to be in, or enter into, a state which allows for that communication to happen. If the Application Processor is in the sleep mode when the IPC activity is initiated then it is "woken up", i.e. switched to operate in an awake mode in order to process the IPC activity. As an example, the awake mode may have a power consumption which is greater than that of the sleep mode by a factor of approximately 50. It is beneficial to minimize the power consumed by the computer system.

SUMMARY

In one aspect, a computer system is disclosed that includes a first processor and a second processor, wherein the first and second processors are configured to communicate with each other via inter processor communication (IPC) activities, wherein the second processor is configured to operate in one of a plurality of modes including: (i) a first mode in which the second processor is able to process IPC activities, and (ii) a second mode in which the second processor does not process IPC activities. In one embodiment, the computer system is configured to implement processing apparatus associated with the first processor, the processing apparatus being configured to: (1) identify which of a plurality of pending IPC activities for communicating from the first processor to the second processor are not real-time sensitive and (2) schedule the identified IPC activities for communicating from the first processor to the second processor by delaying at least one of the identified IPC activities to thereby group the identified IPC activities together into a group, wherein the grouped IPC activities in the group are scheduled for communicating to the second processor during a period in which the second processor is continuously in the first mode.

In another aspect, a method of scheduling inter processor communication (IPC) activities in a computer system having a first processor and a second processor is disclosed, wherein the first and second processors are configured to communicate with each other via the inter processor communication (IPC) activities, and wherein the second processor is configured to operate in one of a plurality of modes including: (i) a first mode in which the second processor is able to process IPC activities, and (ii) a second mode in which the second processor does not process IPC activities. In one embodiment, the method includes implementing processing apparatus associated with the first processor to: (1) identify which of a plurality of pending IPC activities for communicating from the first processor to the second processor are not real-time sensitive and (2) schedule the identified IPC activities for communicating from the first processor to the second processor by delaying at least one of the identified IPC activities to thereby group the identified IPC activities together into a group, wherein the grouped IPC activities in the group are scheduled for communicating to the second processor during a period in which the second processor is continuously in the first mode.

In yet another aspect, a computer program product is disclosed that is configured to implement a scheduler for scheduling inter processor communication (IPC) activities in a computer system including a first processor and a second processor, wherein the first and second processors are configured to communicate with each other via the inter processor communication (IPC) activities, and wherein the second processor is configured to operate in one of a plurality of modes including: (i) a first mode in which the second processor is able to process IPC activities, and (ii) a second mode in which the second processor does not process IPC activities. In one embodiment, the computer program product is embodied on a non-transitory computer-readable storage medium and configured so as when executed on the first processor to perform the operations of: (1) identifying which of a plurality of pending IPC activities for communicating from the first processor to the second processor are not real-time sensitive and (2) scheduling the identified IPC activities for communicating from the first processor to the second processor by delaying at least one of the identified IPC activities to thereby group the identified IPC activities together into a group, wherein the grouped IPC activities in the group are scheduled for communicating to the second processor during a period in which the second processor is continuously in the first mode.

BRIEF DESCRIPTION OF THE DRAWINGS

For a better understanding of the disclosure and to show how the same may be put into effect, reference will now be made, by way of example, to the following drawings in which.

DETAILED DESCRIPTION

The disclosure recognizes that the overall power consumption associated with IPC activities is dominated by latency, not by the actual processing of information sent over the IPC. For many processors, there is significant latency to exit and enter a sleep mode. For example, it may take tens of milliseconds to exit a sleep mode. The magnitude of the latency associated with entering a sleep mode may depend on the underlying physical interface which is used for the IPC between two processors. For example, a Universal Serial Bus (USB) interface typically requires at least one second of idle time before switching to a USB suspend state (or "sleep mode"). Other serial interfaces (e.g. a Mobile Industry Processor Interface (MIPI), such as a High-Speed Synchronous Interface (HSI)) might exhibit lower latencies, for example in the order of hundreds of milliseconds. In contrast, the processing of small quanta of data sent in an IPC activity to a remote processor may be relatively very fast. For example, when a local processor sends information on the IPC to notify the remote processor of a new local processor state, the remote processor is usually able to handle the information within tens of milliseconds.

Accordingly, as noted above the disclosure provides a computer system that in one embodiment includes: a first processor; and a second processor, wherein the first and second processors are configured to communicate with each other via inter processor communication (IPC) activities, wherein the second processor is configured to operate in one of a plurality of modes including: (i) a first mode in which the second processor is able to process IPC activities, and (ii) a second mode in which the second processor does not process IPC activities, wherein the computer system is configured to implement processing apparatus associated with the first processor, the processing apparatus being configured to: identify which of a plurality of pending IPC activities for communicating from the first processor to the second processor are not real-time sensitive; and schedule the identified IPC activities for communicating from the first processor to the second processor by delaying at least one of the identified IPC activities to thereby group the identified IPC activities together into a group, wherein the grouped IPC activities in the group are scheduled for communicating to the second processor during a period in which the second processor is continuously in the first mode. In one example, the processing apparatus is implemented on the first processor.

By grouping the non real-time sensitive IPC activities together and scheduling them for communicating to the second processor during a period in which the second processor is continuously in the first mode, the number of times that the second processor enters and exits the second mode (e.g. sleep mode) is reduced. This reduces the power consumed by the computer system in handling the IPC activities. As stated above, the overall power consumption associated with IPC activities is dominated by latency, not by the actual processing of information sent over the IPC.

Embodiments of the disclosure will now be described by way of example only.

Figure 1:
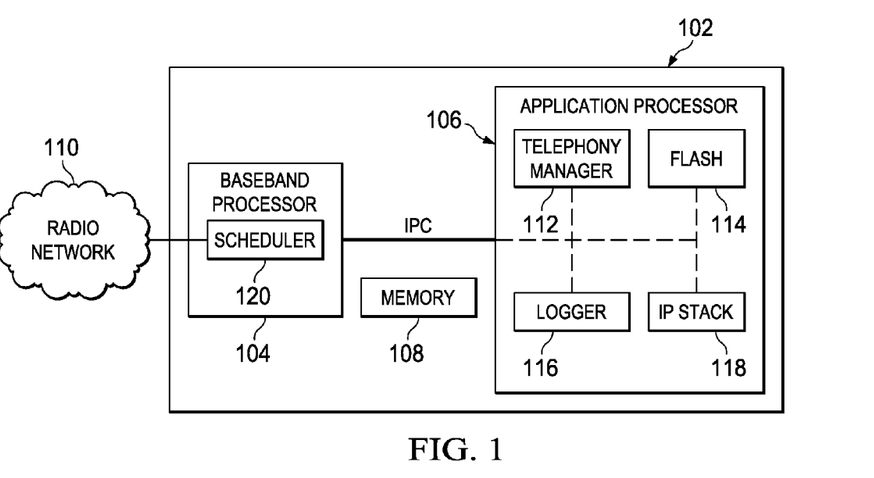
FIG. 1 shows a schematic illustration of a communication system.

Reference is first made to FIG. 1, which illustrates a communication system in which a user device 102 operates. The user device 102 is connected to a radio network 110, such as a mobile telephone network. The user device 102 may be, for example, a mobile phone, a tablet, a laptop computer or other embedded device able to connect to the network 110. The user device 102 is configured to implement a computer system including two sub systems, which each implement a separate processor. FIG. 1 shows the computer system of the user device 102 including a first sub-system implementing a baseband processor 104 and a second sub-system implementing an Application Processor (AP) 106. The two processors 104 and 106 operate independently of each other. The baseband processor 104 acts as a Radio Frequency (RF) modem to process data for communication between the user device 102 and the network 110. FIG. 1 shows a link between the baseband processor 104 and the radio network 110 to indicate that the baseband processor 104 is implemented at the user device 102 for communicating with the radio network 110. The application processor 106 executes an operating system of the user device 102 and handles other multimedia features on the user device 102. For example, the application processor 106 processes data relating to peripherals (not shown in FIG. 1) of the user device 102 such as a display, a Wi-Fi module, a GPS module, etc. The user device 102 also includes a memory 108 for storing data.

There is a physical interface configured for communicating IPC activities between the baseband processor 104 and the application processor 106. The physical interface may, for example, be one of: (i) a Universal Serial Bus (USB) interface, (ii) a Mobile Industry Processor Interface (MIPI), such as a High-Speed Synchronous Interface (HSI), (iii) a Serial Peripheral Interface (SPI), or (iv) a shared memory.

The application processor 106 executes various modules, such as a telephony manager 112, a flash memory module 114, a logger module 116 and an Internet Protocol (IP) stack module 118. The telephony manager 112 is configured to process data relating to calls that the user device 102 has over the network 110. The flash memory module 114 is configured to manage data storage and/or retrieval from a flash memory on the user device 102. The logger module 116 is configured to process logging information, which may for example, amongst other things, keep a log of the operating states of the processors 104 and 106. The IP stack module 118 is configured to process data for communication to and from the Internet (e.g. via the radio network 110) according to Internet protocols.

Communication between the two sub-systems (i.e. communication between the processors 104 and 106) is referred to as Inter Processor Communication (IPC). "IPC activities"

are communications between the two processors 104 and 106. The IPC activities convey various types of information, spread over several communication channels, including:

- control information (e.g. for initiating voice calls between the user device 102 and another node of the radio network 110), which may be processed by the telephony manager 112;
- data (e.g. Internet Protocol (IP) data for transmission between the user device 102 and another node of the radio network 110, which may be processed by the IP stack module 118);
- logging information, which may be processed by the logger module 116; and
- file system information (e.g. when the baseband file system is physically located on AP-managed Flash memory), which may be processed by the flash memory module 114.

Each processor (104 and 106) may operate in one of a plurality of possible operational modes. For example, the Application Processor 106 may operate in an awake mode in which it is able to process IPC activities that it receives from the baseband processor 104. The Application Processor 106 may alternatively operate in a sleep mode in which it does not process IPC activities. Typically the Application Processor 106 will consume less power when it operates in the sleep mode compared to when it operates in the awake mode. Therefore, when no IPC activities are being communicated between the processors (104 and 106), the Application Processor 106 may be configured to operate in the sleep mode to conserve power. Every time a quantum of data is sent over the IPC from the baseband processor 104 to the Application Processor 106, the Application Processor 106 needs to be in, or enter into, a state which allows for that communication to happen. If the Application Processor 106 is in the sleep mode when the IPC activity is initiated then it is "woken up", i.e. switched to operate in an awake mode in order to process the IPC activity. As an example, the awake mode may have a power consumption which is greater than that of the sleep mode by a factor of approximately 50.

From the point-of-view of the baseband sub-system, the baseband processor 104 can be referred to as a local processor for the IPC and the application processor 106 can be referred to as a remote processor for the IPC. However, from the point-of-view of the application processor sub-system, the application processor 106 can be referred to as a local processor for the IPC and the baseband processor 104 can be referred to as a remote processor for the IPC.

Figure 2:
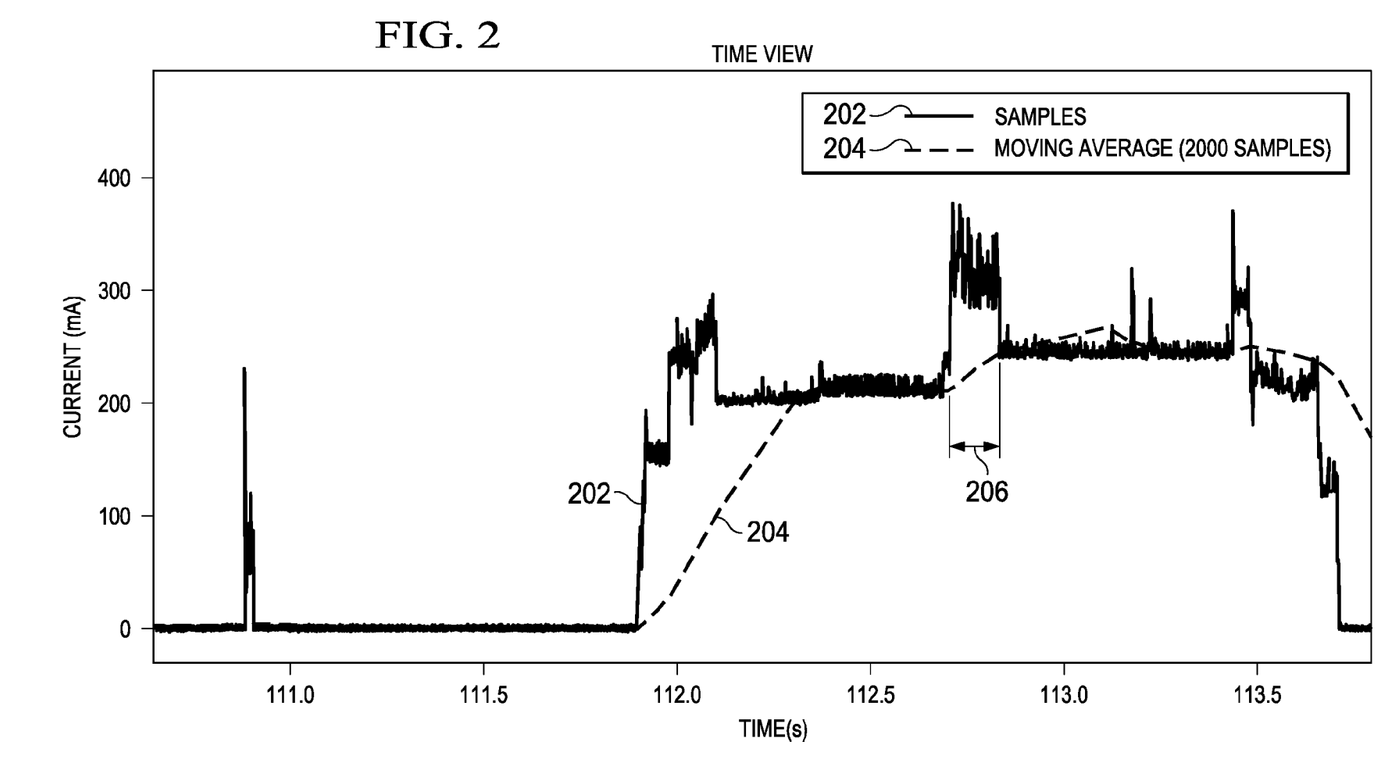
FIG. 2 is a graph showing the current consumed by a computer system as a function of time.

FIG. 2 is a graph showing the combined current consumption of the Application Processor sub-system and the baseband sub-system in the computer system as a function of time according to one example. The graph shows two lines. Line 202 shows the measured samples of the combined current consumed by the two sub-systems, whilst line 204 shows a moving average of the measured samples averaged over 2000 samples to thereby smooth out the rapid fluctuations of the measured current samples shown by line 202.

In the graph shown in FIG. 2, at around time t=110.8, there is some baseband activity (e.g. the baseband processor 104 processes data for communication to/from the network 110). The baseband processor 104 consumes some current in performing the baseband activity, thereby resulting in the small spike at around t=110.8 shown in FIG. 2. Prior to time t=111.8 the Application Processor 106 is in the sleep mode. The baseband activity of the baseband processor at time t=110.8 does not cause any IPC activity to the Application Processor 106, and as such the Application Processor 106 is not woken up from the sleep state. When the application processor 106 is in the sleep mode and there is no baseband activity, it can be seen in FIG. 2 that the current consumption is approximately 5 mA.

At time t=111.8 there is some similar baseband activity. However, this baseband activity triggers a signal strength notification to be communicated from the baseband processor 104 to the Application processor 106 via the IPC interface. This IPC activity causes the application processor 106 to wake from its sleep mode. The application processor 106 processes the signal strength notification in an awake mode and then switches back to the sleep mode. There is a latency involved in exiting the sleep mode related to intrinsic aspects of the platform (hardware and software) (e.g. of approximately one second) and there is a latency involved in re-entering the sleep mode after the signal strength notification has been processed (e.g. of approximately one second when the IPC interface is a USB interface). In the example shown in FIG. 2 the application processor 106 exits the sleep mode at time t=111.8, the signal strength notification (that is, the IPC data) is processed by the application processor 106 from time t=112.7 to time t=112.8 (as shown by the time period 206 indicated in FIG. 2), and then the application processor 106 finishes re-entering the sleep mode at time t=113.75. FIG. 2 shows that the current consumption increases by approximately 200 mA when the application processor 106 is in the awake mode (compared to when the application processor 106 is in the sleep mode) between time t=111.8 and time t=113.75. Although it can only takes a few milliseconds to process the notification on the Application Processor 106 (indicated by period 206), the latency associated with the application processor 106 leaving and subsequently re-entering the sleep mode causes the current to jump up by around 200 mA for about two seconds. The actual processing of the IPC data is represented by the period 206 and takes approximately 100 ms (between times t=112.7 and t=112.8).

It can be seen in FIG. 2 that the increase in current consumption corresponding to the baseband activity at about time t=110.8 (which did not cause any IPC activity) was short in duration compared to the increase in current consumption corresponding to the baseband activity at about time t=111.8 (which did cause IPC activity).

Assuming the application processor 106 starts in the sleep mode and then re-enters the sleep mode following the processing of a quantum of IPC data, the energy required to process one quantum of IPC data, E(1), can be expressed as:

$$E(1) = P_w T_w + P_p T_p + P_{es} T_{es},$$

where $P_w T_w$ is the energy (power consumption multiplied by duration) of the wakeup phase of the application processor 106, $P_p T_p$ is the energy (power consumption multiplied by duration) of the processing phase of the IPC data on the application processor 106, and $P_{es} T_{es}$ is the energy (power consumption multiplied by duration) consumed when the application processor 106 is waiting to enter the sleep mode after processing the IPC data.

In one example of the Application Processor 106, the following values were determined empirically:
$P_w \cong P_{es} \cong 456$ mW,
$T_w \cong 600$ ms,
$P_p \cong 760$ ms,
$T_p \cong 100$ ms (for a typical IPC activity), and
$T_{es} \cong 1$ s (for USB suspend to complete).

With these values, the energy of the processing phase of the IPC data on the application processor 106 is 76 mJ, and the total energy consumed, E(1), is 806 mJ. Therefore, the energy required to process one quantum of IPC data typically represents about 10% of overall energy consumed.

Furthermore, the information conveyed over the IPC is inherently asynchronous, i.e. there is no simple rule that relates, or can predict, when various communication channels are active with respect to one another. In the absence of a centralized IPC scheduler, a lot of power may be wasted if in the worst case all IPC activities cause the remote processor to wake up from sleep mode.

However, as shown in FIG. 1, there is a centralized scheduler 120 which is associated with the baseband processor 104. In the example shown in FIG. 1, the scheduler 120 is implemented as a software module on the baseband processor 104. However, in other embodiments the scheduler 120 may be implemented by one or more software and/or hardware modules on the user device 102. The scheduler 120 schedules the communication of IPC activities between the processors 104 and 106. The scheduler 120 aims to reduce the power consumption associated with the IPC activities by reducing the number of times that the remote processor enters and exits the sleep mode. The scheduler 120 may control the scheduling of IPC activities in both directions between the processors 104 and 106. Alternatively, the scheduler 120 may control the scheduling only of IPC activities communicated from the baseband processor 104 to the application processor 106, whilst a separate scheduler (e.g. implemented on the application processor) controls the scheduling of IPC activities communicated from the application processor 106 to the baseband processor 104.

The expected energy required to process N quanta of IPC data in one period for which the application processor 106 is continuously in the awake mode is given by:

$$E(N) = P_w T_w + N \cdot P_p T_p + P_{es} T_{es}.$$

Since the application processor 106 (i.e. the remote processor in the examples described herein) performs a plurality of IPC activities (that is, N IPC activities) during one awake phase of the application processor 106, energy is conserved relative to a scenario in which the application processor 106 is woken up and then sent back to sleep between the processing of each of the N IPC activities. In particular, the fraction given by the energy required to process N quanta of IPC data in one continuous awake phase of the application processor 106 over N times the energy required to process 1 quantum of IPC data is:

$$\frac{E(N)}{N \cdot E(1)} = \frac{1}{E(1)} \left[ \frac{P_w T_w + P_{es} T_{es}}{N} + P_p T_p \right].$$

This ratio falls quickly as N increases. Using the empirical values given above for $P_w$, $T_w$, $P_p$, $T_p$, $P_{es}$ and $T_{es}$ the following table shows a summary of the power saving:

| N  | Total Energy (mJ) | Energy/N (mJ) | Energy Saving (%) |
|----|-------------------|---------------|-------------------|
| 1  | 805               | 805           | 0%                |
| 2  | 882               | 441           | 45%               |
| 3  | 958               | 329           | 60%               |
| 4  | 1033              | 258           | 67%               |
| 5  | 1110              | 222           | 72%               |
| 10 | 1490              | 149           | 81%               |
| 20 | 2250              | 112           | 86%               |

It can be seen from the table that as N increases the energy consumed per IPC activity reduces.

According to embodiments of the disclosure, the scheduler 120 identifies IPC activities that are not real-time sensitive and which can be delayed until it is deemed profitable to run them. The identified IPC activities are aggregated by a software framework that allows registering non-urgent requests to communicate with the remote processor, (e.g. the application processor 106). In some embodiments, the scheduler 120 finds the best possible time to trigger all pending non real-time sensitive IPC activities.

Figure 3:
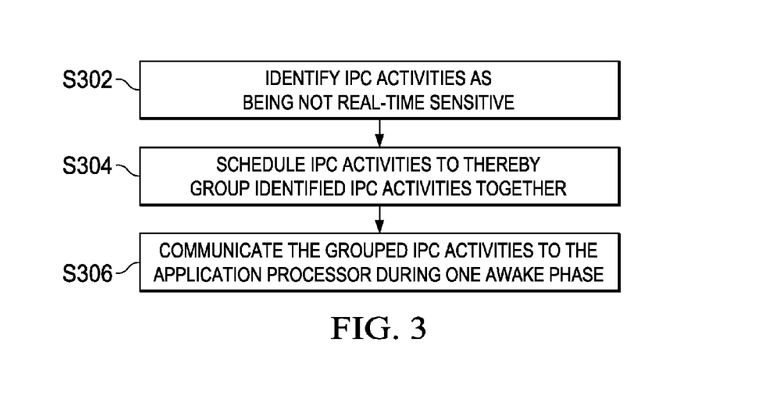
FIG. 3 is a flow chart for an embodiment of a process of scheduling IPC activities in a computer system according to the principles of the disclosure.

FIG. 3 shows a flow chart for a process, implemented by the scheduler 120, of scheduling IPC activities for communicating from the baseband processor 104 to the application processor 106. In step S302 the scheduler 120 identifies which of a plurality of pending IPC activities for communicating from the baseband processor 104 to the application processor 106 are not real-time sensitive. Those IPC activities which are not real-time sensitive can be delayed. IPC activities which are not real-time sensitive are not urgent. In contrast, IPC activities which are real-time sensitive are urgent and should not be delayed. Real-time sensitive IPC activities are communicated over the IPC interface from the baseband processor 104 to the application processor 106, without delay.

However, for those IPC activities which are identified as being not real-time sensitive in step S302, in step S304 the scheduler 120 schedules the IPC activities for communication from the baseband processor 104 to the application processor 106. In particular, the scheduler 120 delays at least one of the identified IPC activities to thereby group the identified IPC activities together into a group. The grouped IPC activities in the group are then scheduled for communicating to the application processor 106 during a single awake phase of the application processor 106, that is, during a single period in which the application processor 106 is continuously in the awake mode.

In step S306 the grouped IPC activities are communicated from the baseband processor 104 to the application processor 106 in accordance with the scheduling of the identified IPC activities performed in step S304.

In this way, the non real-time sensitive IPC activities are aggregated and sent to the application processor 106 during one awake phase of the application processor 106. This reduces the number of times that the application processor 106 is woken up from its sleep mode for processing the IPC activities. The total amount of time spent by the application processor 106 in the awake mode is reduced. This is because the amount of time spent in the wake-up phase ($T_w$) and the time spent waiting to enter the sleep mode ($T_{es}$), in order to process N IPC activities, is reduced (because the number of times that the application processor 106 enters into the wake-up phase and the number of times that the application processor 106 waits to enter the sleep mode is reduced).

It can therefore be seen that there is provided a setup (implemented in one or both of software and hardware) that optimizes system power consumption by scheduling non real-time sensitive IPC activities in a way that minimizes the number of times the remote processor is woken up from a sleep mode. This can be achieved through:

- a software framework that aggregates all software requests to communicate with the remote processor (i.e. IPC activities),
- a software algorithm that minimizes power consumption by delaying and grouping IPC activities as much as possible, and/or
- a variety of hardware methods allowing the software framework to find the best possible time to service requests for IPC activities.

The scheduler 120 may be implemented in a number of different ways, which have varying degrees of complexity and efficiency.

For example, the scheduler 120 may implement a procrastination method. In this example, the scheduler 120 allocates a respective timer, herein referred to as a "lazy timer", to each of the non real-time sensitive IPC activities identified in step S302. Each IPC activity is sent on the IPC interface when its respective lazy timer fires. Lazy timers are inaccurate by design. That is, they are not provided with a time at which they are supposed to fire. Instead, the lazy timers are provided with a deadline before which they are expected to fire. Lazy timers wait until the last possible moment to fire. However when one of the registered timers fires, all registered timers expire at the same time, causing all the aggregated IPC activities to be served at the same time. When one of the lazy timers fires this causes the respective IPC activity to be communicated on the IPC interface to the application processor 106, thereby waking up the application processor 106. Therefore, this is a good time to schedule all the other pending, aggregated IPC activities to be sent to the application processor 106 because the scheduler 120 can deduce that the application processor 106 is in the awake mode.

In general, each lazy timer is configured to fire in response to the earlier of: (i) the expiry of a respective deadline provided to the lazy timer before which it is expected to fire, or (ii) a determination that the application processor 106 is in the awake mode. In the simple example, given above, the determination that the application processor 106 is in the awake mode is performed by determining that one of the other lazy timers has fired.

This method is simple to implement and addresses the problem that IPC activities are asynchronous to each other by grouping non real-time activities together.

The procrastination property of the scheduler 120 as described in the example given above helps to synchronize non real-time sensitive IPC activities, however it does not synchronize these IPC activities with other IPC activities that are real-time sensitive, i.e. that can't wait before being scheduled. In step S302 some of the IPC activities are determined as being real-time sensitive, and those IPC activities are communicated to the application processor 106 without delay. The communication of such real-time sensitive IPC activities will result in the application processor 106 operating in the awake mode. In a second example, the scheduler 120 can deduce that the application processor 106 will be in the awake mode by determining that real-time sensitive IPC activities are being sent to the application processor 106, and on that basis can schedule the non real-time sensitive IPC activities to be communicated to the application processor 106 to make use of the awake mode of the application processor 106.

In order to determine that real-time sensitive IPC activities are being sent to the application processor 106, the scheduler 120 registers to the underlying physical IPC interface in order to receive notifications of state changes of the IPC interface. The scheduler 120 can perform the determination that the application processor 106 is in the awake mode by receiving a notification that the physical IPC interface is in an active state. When the IPC interface enters an active state the scheduler 120 deems it appropriate to fire all registered lazy timers. In this way the non real-time sensitive IPC activities are sent to the application processor 106 at a time when the application processor 106 is in the awake mode due to the communication of a previous real-time sensitive IPC activity.

This is efficient in practice because it allows taking advantage of IPC interface activity to schedule non real-time activities without waking the remote application processor 106 from its sleep mode (since the application processor 106) is already awake.

In another example, the scheduler 120 can be notified when the remote application processor 106 is active. In this way the scheduler 120 performs the determination that the application processor 106 is in the awake mode by receiving a direct notification of such. This can be achieved through various means.

A hardware connection (e.g. an Input/Output (I/O) connection) may exist between the baseband processor 104 and the application processor 106. The application processor 106 may be configured to control the value on the I/O connection to indicate whether the application processor 106 is currently operating in the awake mode or in the sleep mode. The scheduler 120 determines the value on the I/O connection to thereby determine whether the application processor 106 is in the awake mode. For example, the value of the I/O connection can be driven high when the application processor 106 leaves its sleep state and low when the application processor 106 enters its sleep state. On the baseband processor 104 the I/O can trigger a non-waking interrupt (i.e. an interrupt that wakes the baseband processor 104 from an idle mode but does not wake the baseband processor 104 from a sleep mode), or the baseband processor 104 (e.g. using the scheduler 120) may poll the I/O connection when it is not in a sleep mode.

In another design, a shared memory is used as the IPC interface. In this case, the application processor 106 is configured to maintain a data value (e.g. a dedicated bit) in the shared memory to indicate whether the application processor 106 is currently operating in the awake mode or in the sleep mode. The scheduler 120 reads the data value from the shared memory to thereby determine whether the application processor 106 is in the awake mode.

As described above, if the scheduler 120 can determine whether the application processor 106 is in a sleep mode, IPC activities may be scheduled without waking the application processor 106 from sleep mode by scheduling the IPC activities for times when the application processor 106 is already awake. Notifying the scheduler 120 of when the application processor 106 is awake provides a wider range of opportunities for scheduling the non real-time sensitive IPC activities than if the scheduler 120 is only notified of when the IPC interface is active.

The examples given above may be implemented in combination or separately.

Furthermore, delaying some of the IPC activities to thereby group them together not only results in fewer transitions between the sleep and awake modes on the application processor 106, but it may also reduce the overall number of IPC activities that are communicated and therefore processed by the application processor 106. This can further reduce the power consumed by the computer system, in particular the power consumed by the application processor 106. For example if IPC activities are intended to notify the remote application processor 106 of a rapidly changing state on the local baseband processor 104, the delaying of some IPC activities may mean that an older notification of the state may be superseded by a newer notification of the state before either is communicated to the application processor 106. In this case, the older notification of the state does not need to be, and is not, communicated to the application processor 106. This may for example mean that only the last state will be notified to the remote application processor 106. In other words, the scheduler 120 may determine that one or more of the grouped IPC activities are redundant in view of one or more other IPC activities in the group, and remove the redundant IPC activities from the group such that the redundant IPC activities are not scheduled for communicating to the application processor 106.

In order to use the lazy timers as described above, the scheduler 120 makes use of the lazy timer application programming interface (API). The lazy timer API has the following functions:

Ipc_TimerCreate
    This returns a handle to a new Lazy Timer Ipc_TimerDelete(handle)
    This deletes resources for a timer. If the timer is running it will be stopped prior to deletion.

Ipc_TimerStart(handle, handler, argument, timeout)
    This calls the handler with the specified argument after a maximum of timeout seconds.

Ipc_TimerStop(handle)
    This stops a previously started timer.

Ipc_TimerNotifyHifState
    This notifies the framework (e.g. the scheduler 120) of an IPC interface state change.

The timeout provided to Ipc_TimerStart function is expressed in seconds, which is a voluntarily coarse unit. It may be more difficult to expose the lazy timer API in the AP sub-system.

The use of lazy timers to schedule the communication of IPC activities is particularly suited to IPC activities including logging information. For example, new logging information to be conveyed through the IPC interface may be generated about every second. The logging information is used to keep track of events occurring on the baseband processor 104 (e.g. the current state of the baseband processor 104 or any communication between the baseband processor 104 and the network 110). The logging information may be used to track changes in the state of the baseband processor 104, e.g. for debugging purposes. If the logging information was sent as soon as it was determined on the baseband processor 104, then this may result in a regular communication (e.g. one piece of logging information each second) of logging information on the IPC interface to the application processor 106. For some IPC interfaces, such as a USB interface, sending logging information every second would cause the USB interface to remain in an active mode. The application processor 106 would not have time to enter the sleep mode after processing the logging information in one IPC activity before receiving the next piece of logging information in the next IPC activity. Therefore the application processor 106 would not enter the low power sleep mode. However, the use of lazy timers to aggregate the non real-time sensitive IPC activities (such as those including logging information) together makes the log data transfers more 'bursty' and maybe aligned with other regular IPC activities. In this way, the application processor 106 may have time to enter the sleep mode between the bursts of IPC activity. In this way, the power consumed by the application processor 106 may be reduced.

The baseband subsystem may rely on the application processor 106 for file system accesses. Lazy timers may be used to cache file write accesses. In other words, some of the file write accesses may be delayed to thereby aggregate them together. In order to delay file write accesses they are stored in a cache memory of the baseband subsystem. The scheduler 120 schedules the file write accesses as described above such that a group of them may be retrieved from the cache memory of the baseband subsystem together and sent to the application processor 106 on the IPC interface as a group. This works well because the baseband processor 104 frequently updates files to store information that is specific to the cell it is camping on. These files may be cached in baseband memory with no user impact. In the event of a system crash happening before the file is written to non-volatile memory by the application processor 106, the information can be recovered through a slightly longer network scan.

Instead of using lazy timers to schedule the communication of the IPC activities, buffering may be used in the local (e.g. baseband) side of the IPC interface driver. A decision may be made on a per-channel basis as to whether the information is to be stored in a buffer and as to when the buffered information is to be sent to the remote application processor 106. This method might not be as flexible as the lazy timer method of scheduling described in detail above because: (i) the IPC interface application programming interface (API) may not allow specifying deadlines, (ii) the per-channel granularity may not be fine enough, and/or (iii) data posted at a given time may not be valid at the time it is effectively sent, and unlike with the lazy timer method it may not be possible to reduce the quantity of data passed over the IPC interface by only sending the last state.

The buffering may be application-specific. That is, each module may individually manage how to schedule IPC communication. However this is less efficient than a common scheduler (such as scheduler 120 described above) because the common scheduler 120 is able to optimize scheduling by aggregating all registered requests (e.g. from all applications executing at the baseband processor 104 and requesting to use the IPC interface). The scheduler 120 is a centralized IPC scheduler, which schedules the IPC activities of a plurality of communication channels. This allows the scheduler 120 to make best use of the times at which the application processor 106 is in the awake mode by scheduling all pending IPC activities (irrespective of communication channel of application to which the IPC activity relates) when it is determined that the application processor 106 is in the awake mode. In this way, the scheduler 120 is configured to delay non real-time sensitive IPC activities until a time at which it is deemed profitable to communicate them.

In the examples described above, the application processor (i.e. the remote processor) operates in an awake mode or a sleep mode. In other examples, the application processor 106 may operate in other (additional or alternative) modes. For the methods described above to be particularly useful, the application processor 106 should be able to operate in a first mode in which the application processor 106 is able to process IPC activities (which in the examples described above is the awake mode), and in a second mode in which the application processor 106 does not process IPC activities (which in the examples described above is the sleep mode).

In the examples described in detail above, the scheduler 120 schedules the IPC activities for communicating from the baseband processor 104 to the application processor 106. In that case, the application processor 106 is the remote processor for the IPC and the baseband processor 104 is the local processor for the IPC. A scheduler may implement the same scheduling techniques as those described above, but configured to schedule IPC activities from the application processor 106 to the baseband processor 104. In the same way, as described above, the scheduler may group non real-time sensitive IPC activities together (e.g. using lazy timers) to thereby send IPC activities in a group from the application processor 106 to the baseband processor. The scheduler for scheduling IPC activities for communicating from the application processor 106 to the baseband processor 104 may, or may not, be the same as the scheduler 120 which schedules the IPC activities for communicating from the baseband processor 14 to the application processor 106 as described above.

In the examples described above the inter processor communication is between the baseband processor 104 and the application processor 106. However, in other examples, IPC activities may be communicated as described above between any two (or more) processors on the computer system.

The method described above with reference to the flow chart of FIG. 3 may be implemented by executing a computer program product on the user device 102. For example, there may be provided a computer program product configured to implement the scheduler 120 for scheduling IPC activities in the computer system. The computer program product may be embodied on a computer-readable storage medium and configured so as when executed on the baseband processor 104 to perform the operations performed by the scheduler 120 as described above.

Generally, any of the functions described herein (e.g. the functional steps shown in FIG. 3) can be implemented in modules using software, firmware, hardware (e.g., fixed logic circuitry), or a combination of these implementations. The steps shown separately in FIG. 3 may or may not be implemented as separate modules or steps. The term "module" as used herein generally represents software, firmware, hardware, or a combination thereof. In the case of a software implementation, the module represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors.

The user device 102 may include a computer-readable medium that may be configured to maintain instructions that cause the user device 102, and more particularly the operating system and associated hardware of the user device 102 to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

There are described below some examples showing how the scheduling of the IPC activities can reduce power consumption. The following data were observed on a customer mobile phone design for a scenario in which, over a 36 hour period there is 4 hours of talk time, 500 MB of download data and 100 texts, with the rest of the time being idle, and assuming 0 dBm for voice:

Time to restore state of AP 106 after low power: 1 s
Time to set IPC (USB) interface to sleep mode after last IPC packet: 1 s
Time to process 'simple' IPC activity: 100 ms
Battery voltage: 3.7 mA
Typical idle current consumption: 5 mA
Voice call current: 200 mA=>energy for 4 hours of talk time=4*3600 s*0.2 A*3.7V~=10 kJ Data download current (screen OFF): 350 mA at 8 mbps=>energy for 500 MB: (500*8/8)*0.35 A*3.7V~=0.65 kJ
Text current (screen ON): 200 mA=>energy for 2 hours of text time: 2* 3600 s*0.2 A*3.7V~=5 kJ Some disclosed embodiments mostly apply to the idle time of the application processor 106. In this question we have approximately 30 hours of idle time.

1a. For Logging Information (without the Scheduler 120 as Described Above)

Assuming a typical DRX7 (1.28 s paging cycle) let us initially consider that both the application processor (AP) 106 and the baseband processor (BB) 104 are in low power mode.

T=0: first paging activity; BB wakes up to decode paging block; BB sends logging data out; AP wakes; both AP and BB are awake; current~=200 mA
T=1 s: AP completes exit from low power
T=1.1 s: AP is done writing logging information to non-volatile memory, starts 1 s inactivity timer to schedule USB selective suspend;
T=1.28 s: second paging activity; BB decodes paging block; BB sends logging data out;
T=1.38 s: AP is done writing logging data to non-volatile memory, resets inactivity timer to schedule USB selective suspend;
T=2.38 s: AP inactivity timer fires; USB selective suspend occurs; both AP and BB enter low power mode; current~=5 mA
T=2.56 s: same as T=0s.

In this use case, on any 2.56 s period, the current consumption is at 200 mA for 2.38 s, then 5 mA for the remaining 180 ms=>average current is (200 mA*2.38 s+5 mA*180 ms)/2.56 s~=185 mA.

Therefore the energy for 30 hours: 30*3600 s*0.185 A*3.7V~=70 kJ

Total: idle+data+voice+text=70 kJ+0.65 kJ+10 kJ+5 kJ=85 kJ

1b. For Logging Information (with the Scheduler 120 as Described Above)

Instead of sending logging data out, the BB logger accumulates data in memory and starts an infinite lazy timer. The logging buffer is big enough to accommodate more than 2 minutes of logging in idle mode. In the best case, during these two minutes the IPC will have been used for some other purpose (text messaging, screen state notifications, . . . ) and the logging data will be flushed 'for free'. In the worst case, the IPC needs to be activated every 2 minutes, causing the AP to wake up for 2.1 seconds each time (energy over 30 hours: 30*3600 s*(2.1 s/120 s)*200 mA*3.7V~=1.5 kJ.

We need to add the energy required to page the network: 30*3600 s*5 mA*3.8V=2 kJ. Overall the idle time energy is 3.5 kJ.

Total: idle+data+voice+text=3.5 kJ+0.65 kJ+10 kJ+5 kJ~=20 kJ. It is apparent that this is less than the energy used (85 kJ) when the scheduler 120 is not used.

Beside the energy gain, it also noted that this logging scheme does make it possible to log data in a much less intrusive way as most of the logging is done in baseband memory without waking the AP 106. This is very important during field testing. It is particularly useful during development and testing as it may be necessary to collect logging information and allow the platform to enter low power mode at the same time.

2a. Cache File System Write Accesses (without the Scheduler 120 as Described Above)

The baseband subsystem has a file system cache which allows for file system accesses to happen in baseband memory. When a file that was opened for writing is closed, the contents of the file are sent over the IPC to the AP 106. None of the data written by the baseband processor 104 at run time are critical and therefore the baseband processor 104 can afford to delay flushing written data to the AP Flash memory module 114.

In a mobility scenario (driving around Paris) it was shown that the baseband processor 104 writes files 9 times to the AP flash memory module 114 (with more than 10 s between any of these write accesses) over 86 minutes of testing. That is ~6 AP wake-ups per hour. Every time the AP 106 is woken up, the platform current consumption is ~200 mA over ~2 seconds. 6 wake-ups per hours incurs additional current consumption of 6*200 mA*2 s/3600 s~=650 µA. This is significant in the context of an idle scenario, where a typical average current is 5 mA.

2b. Cache File System Write Accesses (with the Scheduler 120 as Described Above)

By using the scheduler 120 with lazy timers having a 1-hour timeout, the file system client could reduce the amount of AP wake-ups to 1/hour (less if the IPC is used for other purpose in the meantime). That would save ~0.5 mA. A reduction in average current results in a reduction in power consumption of the computer system.

The apparatuses and methods described herein, or at least a portion thereof, may be embodied in or performed by various conventional digital data processors or computers, wherein the processors are programmed or store executable programs of sequences of software instructions to perform one or more of the steps of the methods or sequences. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method, or functions of the apparatuses described herein. Additionally, an apparatus, may be designed to include the necessary circuitry to perform each of or at least some of the step of the disclosed methods or functions.

Certain embodiments of the disclosure or portions thereof may further relate to computer storage products with a non-transitory computer-readable medium that have program code thereon for performing various computer-implemented operations that embody the features or carry out the steps of the methods set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer system comprising:
a first processor; and
a second processor, wherein the first and second processors are configured to communicate with each other via inter processor communication (IPC) activities, wherein the second processor is configured to operate in one of a plurality of modes including: (i) a first mode in which the second processor is able to process IPC activities, and (ii) a second mode in which the second processor does not process IPC activities,
wherein the computer system is configured to implement processing apparatus associated with the first processor, the processing apparatus being configured to:
identify which of a plurality of pending IPC activities for communicating from the first processor to the second processor are not real-time sensitive; and
schedule the identified IPC activities for communicating from the first processor to the second processor by delaying at least one of the identified IPC activities to thereby group the identified IPC activities together into a group, wherein said grouped IPC activities in the group are scheduled for communicating to the second processor during a period in which the second processor is continuously in the first mode.

2. The computer system of claim 1 further configured to communicate said grouped IPC activities in the group to the second processor in accordance with the scheduling of the identified IPC activities.

3. The computer system of claim 1 wherein the first mode is an awake mode of the second processor, and wherein the second mode is a sleep mode of the second processor.

4. The computer system of claim 1 wherein the computer system is implemented on a user device configured to communicate with a radio network, wherein the first processor is a baseband processor configured to process data for communication between the user device and the radio network, and wherein the second processor is an application processor configured to execute an operating system of the user device.

5. The computer system of claim 1 wherein the IPC activities convey information between the first and second processors, wherein the information conveyed by an IPC activity comprises one of: (i) control information, (ii) data, (iii) logging information, and (iv) file system information.

6. The computer system of claim 1 further comprising a physical interface configured for communicating the IPC activities between the first and second processors, said physical interface being one of: (i) a Universal Serial Bus (USB) interface, (ii) a Mobile Industry Processor Interface (MIPI), such as a High-Speed Synchronous Interface (HSI), (iii) a Serial Peripheral Interface (SPI), or (iv) a shared memory.

7. The computer system of claim 1 wherein the processing apparatus comprises at least one of:
(i) one or more software modules implemented on the computer system, and
(ii) one or more hardware modules implemented on the computer system.

8. The computer system of claim 1 wherein the processing apparatus comprises a scheduler configured to implement said scheduling of the identified IPC activities for communicating from the first processor to the second processor, wherein the scheduler is a common scheduler configured to schedule IPC activities for a plurality of application modules implemented at the user device.

9. The computer system of claim 1 wherein the processing apparatus is configured to implement a plurality of timers, wherein said scheduling of the identified IPC activities for communicating from the first processor to the second processor comprises allocating a respective one of said timers to each of said identified IPC activities, wherein the processing apparatus is configured to schedule each of the identified IPC activities for a time at which the corresponding one of said timers fires, and wherein each timer is configured to fire in response to the earlier of: (i) the expiry of a respective deadline provided to the timer before which it is expected to fire, or (ii) a determination that the second processor is in the first mode.

10. The computer system of claim 9 wherein, for one of said timers, said determination that the second processor is in the first mode comprises the processing apparatus determining that another one of the timers has fired.

11. The computer system of claim 9 further comprising a physical interface configured for communicating the IPC activities between the first and second processors, wherein said determination that the second processor is in the first mode comprises the processing apparatus receiving a notification that the physical interface is in an active state.

12. The computer system of claim 9 wherein said determination that the second processor is in the first mode comprises the processing apparatus determining the value on a hardware connection between the first and second processors, wherein the second processor is configured to control the value on the hardware connection to indicate whether the second processor is in the first mode.

13. The computer system of claim 9 wherein said determination that the second processor is in the first mode comprises the processing apparatus reading a data value from a shared memory, wherein the second processor is configured to maintain the data value in the shared memory to indicate whether the second processor is in the first mode.

14. The computer system of claim 1 wherein the processing apparatus is further configured to:
  determine that one or more of the grouped IPC activities in the group are redundant in view of one or more other IPC activities in the group;
  and remove the redundant IPC activities from the group such that the redundant IPC activities are not scheduled for communicating to the second processor.

15. A method of scheduling inter processor communication (IPC) activities in a computer system comprising a first processor and a second processor, wherein the first and second processors are configured to communicate with each other via said inter processor communication (IPC) activities, and wherein the second processor is configured to operate in one of a plurality of modes including: (i) a first mode in which the second processor is able to process IPC activities, and (ii) a second mode in which the second processor does not process IPC activities, the method comprising implementing processing apparatus associated with the first processor to:
  identify which of a plurality of pending IPC activities for communicating from the first processor to the second processor are not real-time sensitive; and
  schedule the identified IPC activities for communicating from the first processor to the second processor by delaying at least one of the identified IPC activities to thereby group the identified IPC activities together into a group, wherein said grouped IPC activities in the group are scheduled for communicating to the second processor during a period in which the second processor is continuously in the first mode.

16. The method of claim 15 further comprising communicating said grouped IPC activities in the group to the second processor in accordance with the scheduling of the identified IPC activities.

17. The method of claim 15 wherein the processing apparatus is configured to implement a plurality of timers, wherein said scheduling of the identified IPC activities for communicating from the first processor to the second processor comprises allocating a respective one of said timers to each of said identified IPC activities, wherein each of the identified IPC activities is scheduled for a time at which the corresponding one of said timers fires, and wherein each timer fires in response to the earlier of: (i) the expiry of a respective deadline provided to the timer before which it is expected to fire, or (ii) a determination that the second processor is in the first mode.

18. The method of claim 17 further comprising performing said determination that the second processor is in the first mode, for one of said timers, by implementing at least one of the following steps:
  (i) determining that another one of the timers has fired;
  (ii) receiving a notification that a physical interface is in an active state, wherein the IPC activities are communicated between the first and second processors via the physical interface;
  (iii) determining a value on a hardware connection between the first and second processors, wherein the second processor is configured to control the value on the hardware connection to indicate whether the second processor is in the first mode; and
  (iv) reading a data value from a shared memory, wherein the second processor is configured to maintain the data value in the shared memory to indicate whether the second processor is in the first mode.

19. The method of claim 15 further comprising:
  determining that one or more of the grouped IPC activities in the group are redundant in view of one or more other IPC activities in the group; and
  removing the redundant IPC activities from the group such that the redundant IPC activities are not scheduled for communicating to the second processor.

20. A computer program product configured to implement a scheduler for scheduling inter processor communication (IPC) activities in a computer system comprising a first processor and a second processor, wherein the first and second processors are configured to communicate with each other via said inter processor communication (IPC) activities, and wherein the second processor is configured to operate in one of a plurality of modes including: (i) a first mode in which the second processor is able to process IPC activities, and (ii) a second mode in which the second processor does not process IPC activities, the computer program product being embodied on a non-transitory computer-readable storage medium and configured so as when executed on the first processor to perform the operations of:
  identifying which of a plurality of pending IPC activities for communicating from the first processor to the second processor are not real-time sensitive; and
  scheduling the identified IPC activities for communicating from the first processor to the second processor by delaying at least one of the identified IPC activities to thereby group the identified IPC activities together into a group, wherein said grouped IPC activities in the group are scheduled for communicating to the second processor during a period in which the second processor is continuously in the first mode.

* * * * *